United States Patent
Shimizu et al.

(10) Patent No.: US 8,559,768 B2
(45) Date of Patent: Oct. 15, 2013

(54) TRAVELING WAVE OPTICAL MODULATOR

(75) Inventors: Ryo Shimizu, Chiyoda-ku (JP); Takahisa Fujita, Chiyoda-ku (JP); Toru Sugamata, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 1039 days.

(21) Appl. No.: 12/311,395

(22) PCT Filed: Sep. 27, 2007

(86) PCT No.: PCT/JP2007/068857
§ 371 (c)(1),
(2), (4) Date: Jul. 13, 2009

(87) PCT Pub. No.: WO2008/047551
PCT Pub. Date: Apr. 24, 2008

(65) Prior Publication Data
US 2010/0027934 A1    Feb. 4, 2010

(30) Foreign Application Priority Data
Sep. 28, 2006    (JP) .................................. 2006 263962

(51) Int. Cl.
*G02F 1/035* (2006.01)
*G02B 6/10* (2006.01)

(52) U.S. Cl.
USPC .................................... 385/2; 385/12; 385/14

(58) Field of Classification Search
USPC ................................................ 385/2, 12–14
See application file for complete search history.

(56) References Cited

U.S. PATENT DOCUMENTS

| 6,421,155 B1 | 7/2002 | Yano |
| 6,674,927 B2 | 1/2004 | Ibukuro |
| 7,224,907 B2 | 5/2007 | Lee et al. |
| 7,263,244 B2 | 8/2007 | Tanaka et al. |
| 7,558,444 B2 | 7/2009 | Shimizu et al. |
| 2007/0003180 A1 | 1/2007 | Tanaka et al. |

FOREIGN PATENT DOCUMENTS

| JP | 10-332939 | 12/1998 |
| JP | 11-183858 A | 7/1999 |
| JP | 3088988 B2 | 9/2000 |
| JP | 2002-287103 A | 10/2002 |
| JP | 2004-173226 A | 6/2004 |
| JP | 2007-10942 A | 1/2007 |
| WO | WO 2005/096077 A1 | 10/2005 |

OTHER PUBLICATIONS

Bravetti, P., et al., Impact of Response Flatness on Duobinary Transmission Performance: An Optimized Transmitter with Improved Sensitivity. IEEE Photonics Technology Letters, vol. 16, No. 9. Sep. 2004, pp. 2159-2161.

*Primary Examiner* — Kevin S Wood
(74) *Attorney, Agent, or Firm* — Chapman and Cutler LLP (57) ABSTRACT

An object of the invention is to provide a traveling-wave-type optical modulator capable of adjusting the frequency characteristics of an electric/optical conversion response over a wide frequency band, preventing the occurrence of jitter, and improving optical transmission characteristics.

A traveling-wave-type optical modulator 20 includes: a substrate that has an electro-optical effect; an optical waveguide that is formed on the substrate; a modulating electrode that controls the modulation of a light wave traveling through the optical waveguide and includes a signal electrode portion 21 and a ground electrode portion; an input interface 22 that is connected to an input side of the signal electrode portion; a terminator 23 that is connected to the end of the signal electrode portion; and an adjustment filter 31 that is provided between the input interface and the signal electrode portion and adjusts frequency characteristics.

It is preferable that the adjustment filter 31 be a passive filter.

9 Claims, 7 Drawing Sheets

FIG. 11

TRAVELING WAVE OPTICAL MODULATOR

TECHNICAL FIELD

The present invention relates to a traveling-wave-type optical modulator, and more particularly, to a traveling-wave-type optical modulator capable of improving frequency characteristics of an electric/optical conversion response.

BACKGROUND ART

In recent years, when an optical modulator is evaluated, a characteristic called jitter indicating a periodic variation in an optical signal obtained during the driving of the optical modulator has drawn attention.

Figure 1:
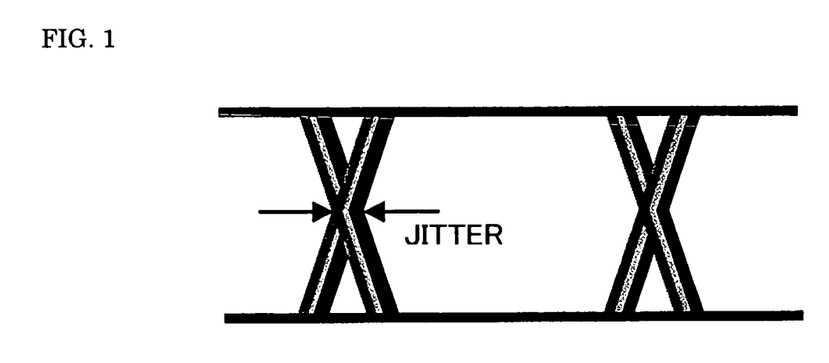
FIG. 1 is a diagram schematically illustrating jitter.

Jitter is an index indicating a periodic variation in the optical signal. As shown in FIG. 1, optical eye pattern waveforms are added up, and the jitter is defined as the width of an intersection of signals.

In order to reduce the jitter of the optical signal obtained during the driving of the optical modulator, it is necessary to improve the following characteristics of an optical modulator or a driver that controls the driving of the optical modulator.

(1) Driver

The driver has frequency characteristics in which gain is flat from a low frequency band to a high frequency band such that an input electric signal is amplified without being deteriorated.

(2) Optical Modulator

The optical modulator has frequency characteristics in which the frequency of an electric/optical conversion response is flat from a low frequency band to a high frequency band such that an input electric signal is converted into an optical signal without being deteriorated.

As described above, when the frequency characteristics of the driver and the optical modulator are infinitely flat (when there is no frequency dependence), the above-mentioned jitter does not occur. However, actually, the frequency characteristics of both the driver and the optical modulator are not flat in a low frequency band, or the frequency characteristics thereof in the high frequency band tend to deteriorate to the lower right side, which results in jitter. In particular, in recent years, a traveling-wave-type optical modulator having a transfer rate of more than 40 Gbps has been used, and the occurrence of the jitter has become an important problem.

In order to reduce the jitter, it is necessary to improve the characteristics of each of the driver and the optical modulator. However, it is very difficult to improve the characteristics of each of the driver and the optical modulator and make the frequency characteristics thereof flat.

For example, since the frequency characteristics of the driver are determined at the design stage, it is difficult to improve the frequency characteristics during or after the manufacture of the driver.

Patent Document 1 discloses a technique that adjusts the impedance of an end portion of a modulating electrode of an optical modulator to improve the frequency characteristics of the optical modulator. However, in this structure, it is difficult to make the frequency characteristics flat up to a high frequency band that enables 40 Gbps transmission.

Only the adjustment of the impedance of the end portion disclosed in Patent Document 1 is insufficient to change a frequency to be adjusted, among the frequency characteristics of the electric/optical conversion response of a traveling-wave-type optical modulator.

[Patent Document 1] Japanese Patent No. 3088988

Even when each of the driver and the optical modulator has good frequency characteristics, jitter may occur when the driver and the optical modulator are combined with each other. Therefore, compatibility between the driver and the optical modulator also needs to be considered.

Therefore, a complicated operation of selecting an optical modulator to be combined with the driver used or selecting a driver to be combined with the optical modulator used is needed in order to obtain good optical transmission characteristics with a small jitter.

In order to solve the above-mentioned problems, the inventors have proposed a traveling-wave-type optical modulator capable of preventing the occurrence of jitter when a driver is used to drive an optical modulator and a method of adjusting the same, particularly, a traveling-wave-type optical modulator capable of improving the flexibility of a combination of a driver and a traveling-wave-type optical modulator and effectively preventing jitter even after the combination, and a method of adjusting the same, which is disclosed in the following Patent Document 2.

[Patent Document 2] International Publication No. WO 2005/096077

In Patent Document 2, a traveling-wave-type optical modulator includes a substrate that has an electro-optical effect, an optical waveguide that is formed on the substrate, and a modulating electrode that controls the modulation of a light wave traveling through the optical waveguide. A driver that controls the driving of the traveling-wave-type optical modulator is connected to the traveling-wave-type optical modulator, and the frequency characteristics of the electric/optical conversion response of the traveling-wave-type optical modulator are adjusted such that the frequency characteristics of the gain of the driver are corrected.

In particular, when the traveling-wave-type optical modulator has a termination resistor, the adjustment of the frequency characteristics of the electric/optical conversion response can be performed by adjusting at least one of the impedance of the modulating electrode and the impedance of the termination resistor. In addition, the adjustment of the frequency characteristics of the electric/optical conversion response at a specific frequency can be performed by adjusting at least one of the length of the modulating electrode and the effective refractive index of a microwave applied to the modulating electrode. Further, the adjustment of the frequency characteristics of the electric/optical conversion response are performed by adjusting the frequency characteristics of the electric/optical conversion response of an optical signal emitted from the traveling-wave-type optical modulator in the range of 300 kHz to 3 GHz with respect to an electric signal input to the driver when the driver drives the traveling-wave-type optical modulator to be approximately flat.

However, in order to reduce jitter and obtain better optical transmission characteristics, it is necessary to adjust the frequency characteristics of the electric/optical conversion response of the traveling-wave-type optical modulator to which the technique disclosed in Patent Document 2 is applied in a wide frequency range including a high frequency band.

Further, in order to obtain good frequency characteristics, it is indispensable to improve the characteristics of electric signals input to the traveling-wave-type optical modulator. In particular, it is necessary to consider all combinations of a signal source and electronic parts or cables through which electric signals pass.

DISCLOSURE OF THE INVENTION

The invention has been made in order to solve the above-mentioned problems, and an object of the invention is to provide a traveling-wave-type optical modulator capable of adjusting the frequency characteristics of the electric/optical conversion response thereof over a wide frequency range, preventing the occurrence of jitter, and improving optical transmission characteristics.

In order to achieve the object, according to a first aspect of the invention, a traveling-wave-type optical modulator includes: a substrate that has an electro-optical effect; an optical waveguide that is formed on the substrate; a modulating electrode that controls the modulation of a light wave traveling through the optical waveguide and includes a signal electrode portion and a ground electrode portion; an input interface that is connected to an input side of the signal electrode portion; a terminator that is connected to the end of the signal electrode portion; and an adjustment filter that is provided between the input interface and the signal electrode portion and adjusts frequency characteristics.

According to a second aspect of the invention, in the traveling-wave-type optical modulator according to the first aspect, preferably, frequency characteristics of the adjustment filter are adjusted to correspond to the frequency characteristics of an electric/optical conversion response of the traveling-wave-type optical modulator.

According to a third aspect of the invention, in the traveling-wave-type optical modulator according to the first aspect, preferably, a driver that controls the traveling-wave-type optical modulator is connected between the input interface and the adjustment filter or between the adjustment filter and the modulating electrode, and the frequency characteristics of the adjustment filter are adjusted to correspond to frequency characteristics of the gain of the driver and the frequency characteristics of the electric/optical conversion response of the traveling-wave-type optical modulator.

According to a fourth aspect of the invention, in the traveling-wave-type optical modulator according to any one of the first to third aspects, preferably, the adjustment filter is a passive filter.

According to a fifth aspect of the invention, in the traveling-wave-type optical modulator according to the fourth aspect, preferably, the passive filter is a high-pass filter or a Bessel-Thompson filter.

According to a sixth aspect of the invention, in the traveling-wave-type optical modulator according to any one of the first to fifth aspects, preferably, the termination resistance of the terminator is adjusted to an impedance difference between the modulating electrode and the terminator, thereby adjusting the frequency characteristics of the electric/optical conversion response of the traveling-wave-type optical modulator (hereinafter, referred to as "adjustment by the optical modulator"). In the adjustment by the optical modulator, as disclosed in Patent Document 2, when the traveling-wave-type optical modulator has a termination resistor, it is possible to adjust the frequency characteristics of the electric/optical conversion response by adjusting at least one of the impedance of the modulating electrode and the impedance of the termination resistor. In addition, it is possible to perform the adjustment of the frequency characteristics by the optical modulator at a specific frequency by adjusting at least one of the length of the modulating electrode and the effective refractive index of a microwave applied to the modulating electrode. In particular, a method of adjusting the frequency characteristics using the termination resistance of a terminator is the simplest method.

According to the first aspect of the invention, the electric signal adjusted by the adjustment filter is input to the signal electrode portion of the traveling-wave-type optical modulator. Therefore, it is possible to improve the frequency characteristics of the electric/optical conversion response of the traveling-wave-type optical modulator over a wide frequency band. For example, it is possible to obtain flat frequency characteristics. In particular, even when the frequency characteristics of the electric signal reaching the adjustment filter vary or deteriorate due to, for example, electronic parts or cables, it is possible to improve the frequency characteristics of the electric/optical conversion response of the traveling-wave-type optical modulator.

Further, the adjustment filter provided between the input interface and the signal electrode portion makes it possible to prevent the reflection of an electric signal due to an impedance difference between the modulating electrode portion and the terminator. As a result, it is possible to improve reflection characteristics (S11 characteristics) of a modulator.

Furthermore, in order to achieve impedance matching between the input interface and an external device, the input interface generally has an impedance of 50Ω. Therefore, it is possible to prevent the reflection of a modulation signal input from the outside of the input interface by setting the impedance of the adjustment filter to, for example, a value between the impedance of the input interface and the impedance of the modulating electrode portion, considering the impedance of the terminator or the impedance of the modulating electrode portion including the signal electrode portion.

According to the second aspect of the invention, the frequency characteristics of the adjustment filter are adjusted to correspond to the frequency characteristics of the electric/optical conversion response of the traveling-wave-type optical modulator. Therefore, it is possible to achieve a traveling-wave-type optical modulator capable of improving the frequency characteristics of the electric/optical conversion response thereof over a wide frequency band even when the traveling-wave-type optical modulators have different unique frequency characteristics.

According to the third aspect of the invention, the driver that controls the driving of the traveling-wave-type optical modulator is connected between the input interface and the adjustment filter or between the adjustment filter and the modulating electrode, and the frequency characteristics of the adjustment filter are adjusted to correspond to frequency characteristics of the gain of the driver and the frequency characteristics of the electric/optical conversion response of the traveling-wave-type optical modulator. Therefore, it is possible to achieve the optimal frequency characteristics of the electric/optical conversion response while compensating a variation or deterioration of an electric signal due to the frequency characteristics of the gain of the driver. In addition, when the frequency characteristics of the gain of the driver can compensate the frequency characteristics of the electric/optical conversion response of the traveling-wave-type optical modulator, the adjustment filter compensates only the frequency band that is not compensated by the driver. Therefore, the adjustment filter can easily adjust the frequency characteristics.

According to the fourth aspect of the invention, since the adjustment filter is a passive filter, the adjustment filter has high compatibility with the electric signal passing therethrough, and it is possible to further improve the S11 characteristics of the terminator.

According to the fifth aspect of the invention, since the passive filter is a high-pass filter or a Bessel-Thompson filter, the high-pass filter can significantly improve frequency characteristics in a high frequency band, and the Bessel-Thompson filter can appropriately adjust frequency characteristics in a frequency band of, for example, less than 3 GHz to obtain frequency characteristics suitable for, particularly, a duo-binary modulation method.

According to the sixth aspect of the invention, the termination resistance of the terminator is adjusted to adjust an impedance difference between the modulating electrode and the terminator, thereby adjusting the frequency characteristics of the electric/optical conversion response of the traveling-wave-type optical modulator. Therefore, frequency bands other than the frequency band adjusted by the optical modulator may be adjusted by the adjustment filter. According to this structure, it is possible to reduce the frequency characteristic modulation load of the adjustment filter.

REFERENCE NUMERALS 1, 24: INCIDENT-SIDE OPTICAL FIBER
2: POLARIZER
3: OPTICAL WAVEGUIDE
4: GROUND ELECTRODE
5: SIGNAL ELECTRODE
6: HIGH-FREQUENCY CABLE
7: DRIVER
8: TERMINATION RESISTOR
9: SUBSTRATE
10, 25: EMISSION-SIDE OPTICAL FIBER
11: ELECTRODE PAD
20: TRAVELING-WAVE-TYPE OPTICAL MODULATOR BODY
21: SIGNAL ELECTRODE PORTION
22: INPUT INTERFACE (CONNECTOR)
23: TERMINATOR
26: CASE
30: RELAY BOARD
31: ADJUSTMENT FILTER
32: RESISTOR
33: CAPACITOR
34: DRIVER (AMPLIFIER)

BEST MODE FOR CARRYING OUT THE INVENTION

Hereinafter, exemplary embodiments of the invention will be described in detail.

The invention provides a traveling-wave-type optical modulator including: a substrate that has an electro-optical effect; an optical waveguide that is formed on the substrate; a modulating electrode that controls the modulation of a light wave traveling through the optical waveguide and includes a signal electrode portion and a ground electrode portion; an input interface that is connected to an input side of the signal electrode portion; a terminator that is connected to the end of the signal electrode portion; and an adjustment filter that is provided the input interface and the signal electrode portion and adjusts frequency characteristics.

Figure 2:
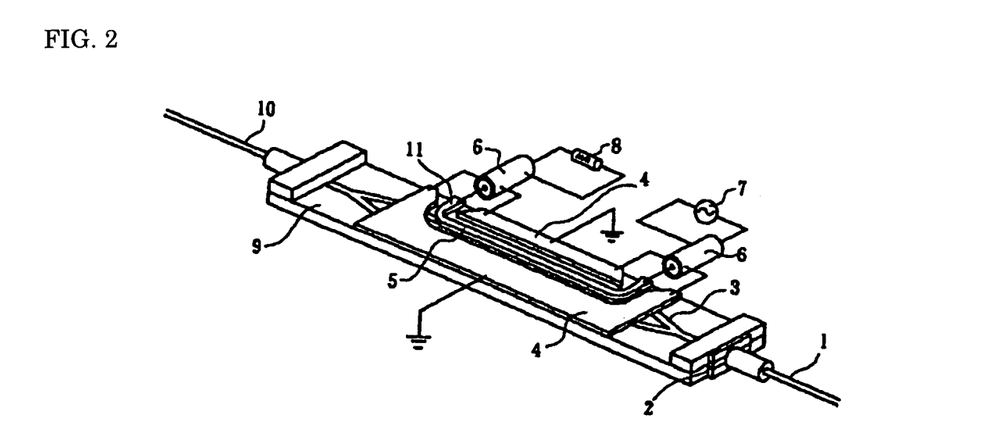
FIG. 2 is a perspective view schematically illustrating a traveling-wave-type optical modulator.

FIG. 2 is a diagram schematically illustrating a general example of a traveling-wave-type optical modulator according to the invention.

A substrate 9 has an electro-optical effect, and is made of, for example, lithium niobate, lithium tantalate, PLZT (lead lanthanum zirconate titanate), or a quartz-based material. Specifically, the substrate is composed of an X-cut plate, a Y-cut plate, and a Z-cut plate of these single crystal materials. In particular, it is preferable that the substrate be formed of lithium niobate (LN) since the material easily forms an optical waveguide device and has large anisotropy.

An optical waveguide 3 is a so-called Mach-Zehnder optical waveguide, and is formed by laminating, for example, titanium (Ti) on the substrate 9 and thermally diffusing it. Although not shown in FIG. 2, in order to reduce the absorption of light passing through the optical waveguide 3 to an electrode layer, a buffer layer made of, for example, a silicon oxide ($SiO_2$) may be formed on the substrate 9. A ground electrode 4 and a signal electrode 5, which are modulating electrodes, are made of a metal material, such as gold (Au). In FIG. 2, a polarizer 2 is provided in order to remove extra components of incident light to polarize light.

High-speed optical transmission using the traveling-wave-type optical modulator shown in FIG. 2 is performed as follows.

Incident light is incident from an incident-side optical fiber 1 and passes through the polarizer 2. Then, the light travels through two divided optical waveguides 3. A transmission signal including signal components in a microwave band is applied from a driver 7 to the signal electrode 5 through an input interface 6. The transmission signal is applied to light traveling through the optical waveguides 3 as a forward electric signal that is transmitted in the same direction as the traveling direction of light traveling through the optical waveguides 3.

When the electric signal is applied, the refractive index of the optical waveguide varies. Therefore, the phase of light traveling through the two divided optical waveguides is changed due to the variation in the refractive index. When light components traveling through the two divided optical waveguides 3 are combined with each other again at the ends of the optical waveguides 3, the combined light components interface with each other, and emission light varies to correspond to a phase difference between the light components traveling through the optical waveguides 3.

In general, in the high-speed optical transmission of the transmission signal including signal components in a microwave band, the impedances (characteristic impedances) of the ground electrode 4 and the signal electrode 5 are matched with the impedance of the driver 7 such that the transmission signal is effectively input from the driver 7 to the signal electrode 5 without being reflected. In addition, generally, a termination resistor 8, which is a terminator, having the same resistance value as the characteristic impedance is provided on the output side of the traveling-wave-type optical modulator shown in FIG. 2 such that the transmission signal input to the signal electrode 5 is not reflected from the output side of the signal electrode, thereby achieving impedance matching.

However, when the frequency characteristics of the electric/optical conversion response of the traveling-wave-type optical modulator are adjusted (adjustment by an optical modulator), both the impedance of the modulating electrode and the impedance of the termination resistor are adjusted, and the reflection of a microwave from a connection portion between the modulating electrode and the termination resistor is positively used. In this case, there may be a difference between the impedance of the modulating electrode and the impedance of the termination resistor.

Figure 3:
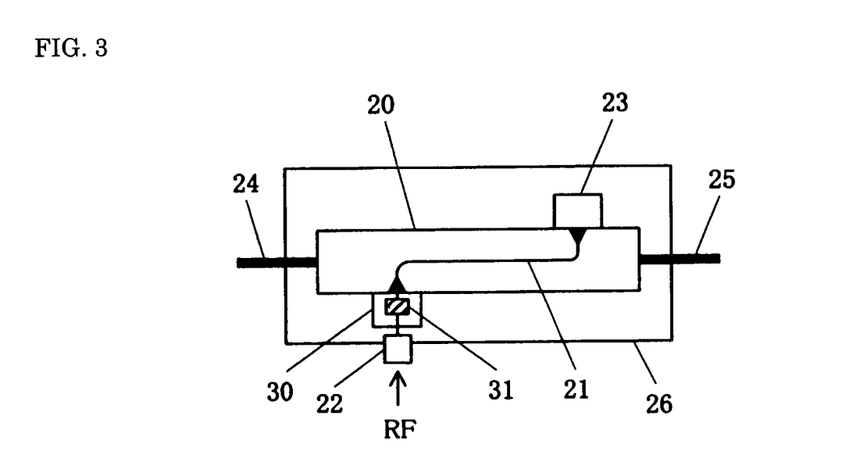
FIG. 3 is a diagram schematically illustrating a traveling-wave-type optical modulator according to the invention.

FIG. 3 is a diagram schematically illustrating the traveling-wave-type optical modulator according to the invention.

Reference numeral 20 denotes a traveling-wave-type optical modulator, and reference numeral 21 denotes a signal electrode portion. In FIG. 3, the ground electrode is omitted. Similar to FIG. 2, an incident-side optical fiber 24 and an emission-side optical fiber 25 are connected to the traveling-wave-type optical modulator 20. The traveling-wave-type optical modulator 20 is accommodated in a case 26 to form a modulator module.

An electric signal is supplied as a microwave signal RF from the outside of the case 26 to the signal electrode portion 21 and then introduced into the case 26 through a connector 22, which is an input interface attached to the case 26.

The invention is characterized in that an adjustment filter 31 is provided between an input interface (22) and the signal electrode portion 21. The electric signal introduced into the case sequentially passes through the adjustment filter 31 and the signal electrode portion 21 to reach a terminator 23. Reference numeral 30 denotes a relay board having the adjustment filter 31 formed thereon.

Figure 4:
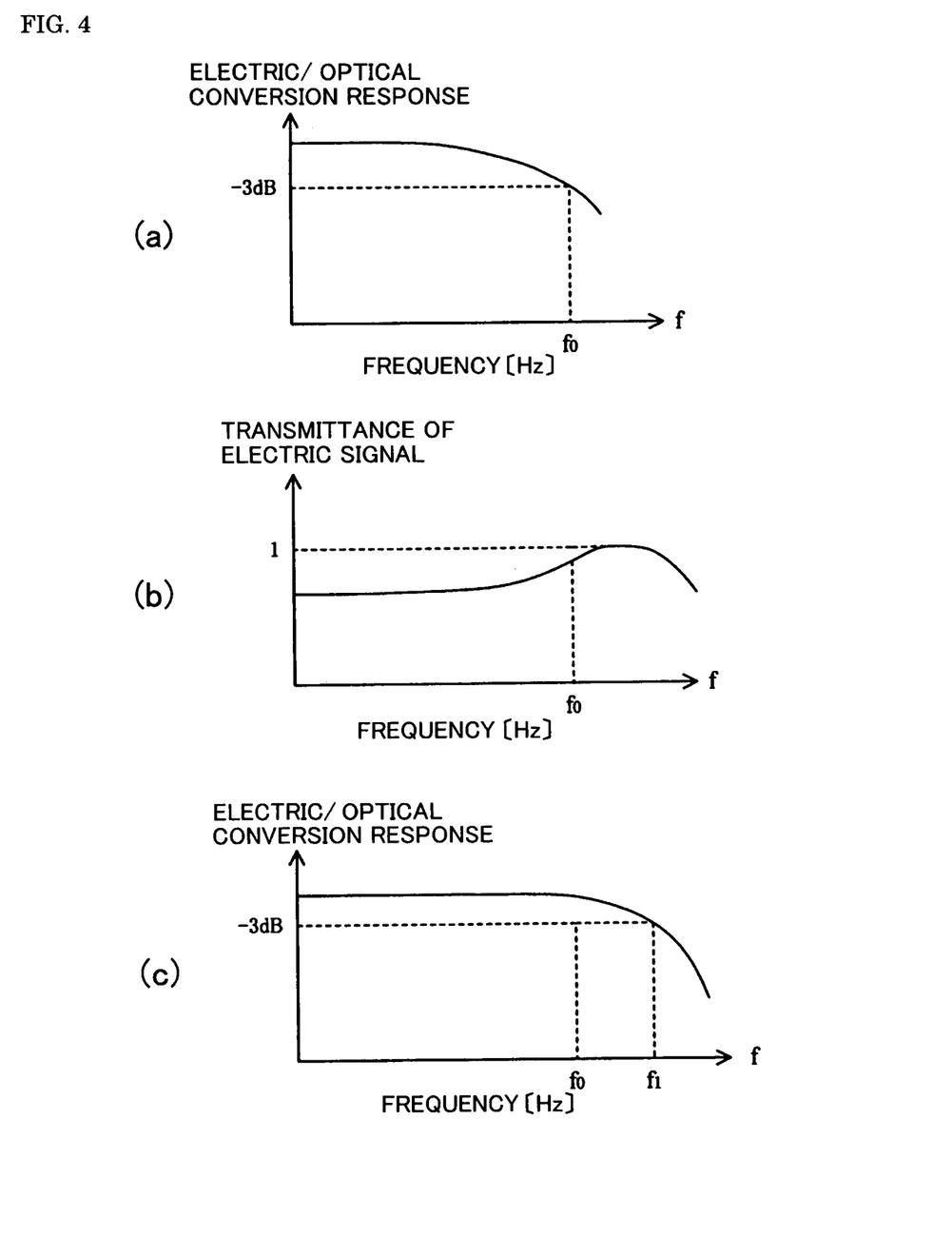
FIG. 4 is a diagram schematically illustrating a method of adjusting the frequency characteristics of the electric/optical conversion response of the traveling-wave-type optical modulator using an adjustment filter.

The adjustment filter according to the invention adjusts the frequency characteristics (variation in the amplitude of a frequency) of the electric signal passing through the adjustment filter in correspondence with the frequency characteristics of the electric/optical conversion response of the traveling-wave-type optical modulator 20. Specifically, in a traveling-wave-type optical modulator having the frequency characteristics of the electric/optical conversion response shown in FIG. 4(a), for example, the adjustment filter adjusts the transmittance of an electric signal, as shown in FIG. 4(b). As a result, the frequency characteristics of the electric/optical conversion response of the traveling-wave-type optical modulator are flat up to a high frequency band, as shown in FIG. 4(c). For example, it is possible to widen the frequency band of an optical modulator having a maximum available frequency $f_0$ to a frequency $f_1$.

In particular, when the adjustment filter is provided between the input interface and the signal electrode portion 21, the adjustment filter can effectively prevent the reflection of an electric signal due to an impedance difference between the modulating electrode and the terminator. Therefore, the optical modulator can improve its own reflection characteristics (S11 characteristics).

In addition, in order to achieve impedance matching between the input interface and an external device, the input interface generally has an impedance of 50Ω. Therefore, it is possible to prevent the reflection of a modulation signal input from the outside of the input interface by setting the impedance of the adjustment filter to, for example, a value between the impedance of the input interface and the impedance of the modulating electrode portion, considering the impedance of the terminator or the impedance of the modulating electrode portion including the signal electrode portion.

It is preferable that the adjustment filter 31 be a so-called passive filter that passes an electric signal to adjust the frequency characteristics of the electric signal.

Figure 5:
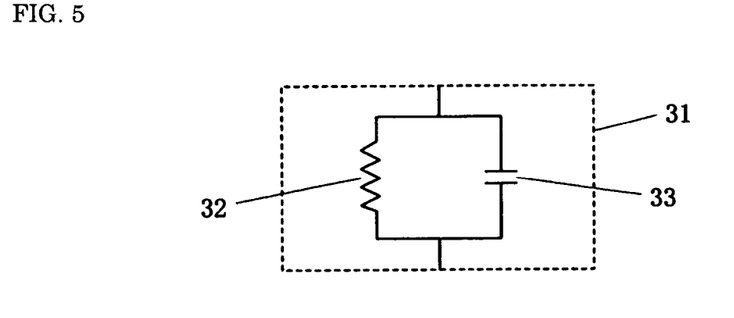
FIG. 5 is a circuit diagram illustrating a high-pass filter used as the adjustment filter.

FIG. 5 is a diagram illustrating an example of a high-pass filter, which is an example of the adjustment filter 31.

The adjustment filter is provided on the relay board 30 made of a high-frequency material, such as alumina, and is formed by connecting a resistor 32, which is a thin film resistor or a chip resistor, and a capacitor 33, which is a chip capacitor, in parallel.

For example, it is possible to change the amplitude direction of the frequency characteristics of an electric signal by changing the resistance of the resistor 32. In addition, it is possible to change a frequency with a variable amplitude by changing the capacitance of the capacitor 33.

As shown in FIG. 4, the high-pass filter is effective in making the frequency characteristics flat and widening a frequency band.

The adjustment filter can not only improve the frequency characteristics of the electric/optical conversion response of the traveling-wave-type optical modulator, but also prevent the frequency characteristics of the electric signal transmitted to the adjustment filter from varying or deteriorating due to electronic parts or cables. In this case, the amplitude values of other frequency bands as well as the amplitude value of the varied or deteriorated frequency band are adjusted.

In the traveling-wave-type optical modulator according to the invention, when a driver that controls the driving of the traveling-wave-type optical modulator is connected to the input side of the input interface or between the input interface and the adjustment filter, the frequency characteristics of the adjustment filter are adjusted to correspond to the frequency characteristics of the gain of the driver and the frequency characteristics of the electric/optical conversion response of the traveling-wave-type optical modulator.

Figure 6:
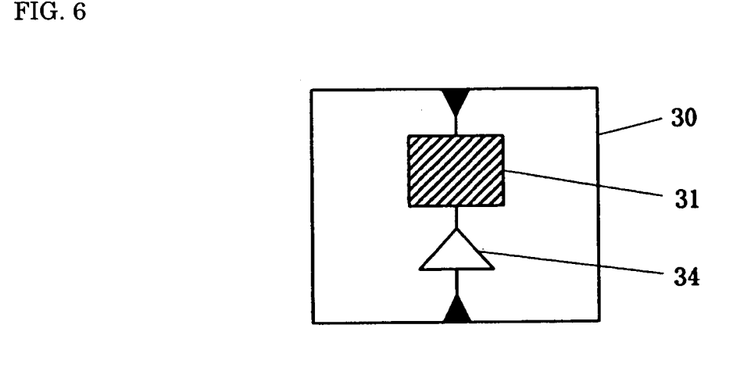
FIG. 6 is a diagram illustrating a driver and the adjustment filter provided on a relay board.

FIG. 6 is a diagram illustrating a driver 34 provided between the input interface and the adjustment filter 31. As shown in FIG. 6, the driver 34 is integrally provided on the relay board 30 having the adjustment filter 31 formed thereon. In this way, it is possible to facilitate the connection of electronic parts and prevent the deterioration of an electric signal due to the connection.

The adjustment filter 31 can achieve the optimal frequency characteristics of the electric/optical conversion response while compensating the variation or deterioration of an electric signal due to the frequency characteristics of the gain of the driver. In addition, when the frequency characteristics of the gain of the driver can compensate the frequency characteristics of the electric/optical conversion response of the traveling-wave-type optical modulator, the adjustment filter compensates only the frequency band that is not compensated by the driver. Therefore, the adjustment filter can easily adjust the frequency characteristics.

Next, another example of the adjustment filter will be described.

Figure 7:
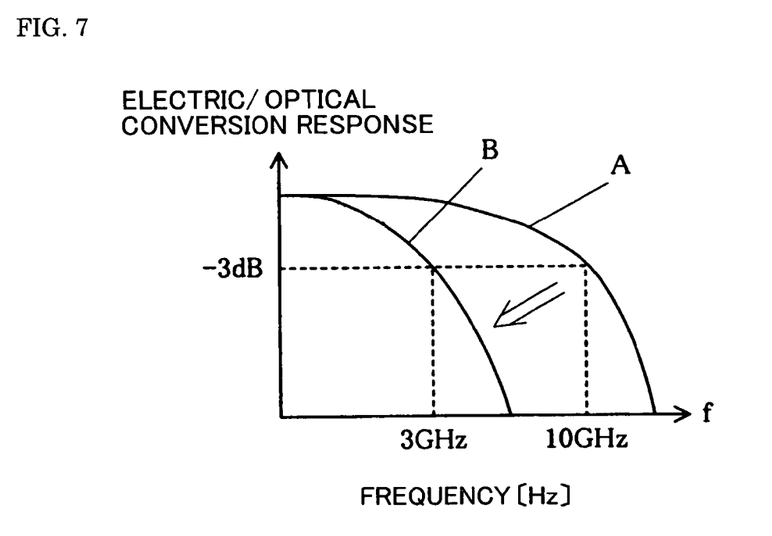
FIG. 7 is a diagram illustrating the narrowing of a frequency band of the frequency characteristics of the electric/optical conversion response by the adjustment filter.

As shown in FIG. 7, an adjustment filter may be used to narrow an available frequency band from the frequency characteristics A of the electric/optical conversion response of the traveling-wave-type optical modulator to frequency characteristics B.

The narrowing of the frequency band makes it possible to achieve frequency characteristics suitable for a duo-binary modulation method.

In this case, a Bessel-Thompson filter may be used as the adjustment filter 31.

In addition, the adjustment of the frequency characteristics of the electric/optical conversion response of the traveling-wave-type optical modulator (adjustment by the optical modulator) may be combined with the adjustment of the frequency characteristics by the adjustment filter, which is disclosed in Patent Document 2. In this case, frequency bands other than the frequency band adjusted by the optical modulator may be adjusted by the adjustment filter. According to this structure, it is possible to reduce the frequency characteristic modulation load of the adjustment filter.

In the adjustment by the optical modulator, as disclosed in Patent Document 2, when the traveling-wave-type optical modulator has a termination resistor, it is possible to adjust the frequency characteristics of the electric/optical conversion response by adjusting at least one of the impedance of the modulating electrode and the impedance of the termination resistor.

Specifically, when the impedance of the termination resistor is larger than the impedance of the modulating electrode, which is a reference value, the frequency characteristics of the electric/optical conversion response of the optical modulator tend to decrease in a high frequency range. On the other hand, when the impedance of the termination resistor is smaller than the reference value, the frequency characteristics of the electric/optical conversion response of the optical modulator tend to increase in a high frequency range.

For example, as a method of adjusting the impedance of the modulating electrode or the impedance of the termination resistor, any of the following methods may be used: a method of trimming a resistor film of the termination resistor to change the resistance of the termination resistor; a method of incorporating a variable resistor into a circuit forming the termination resistor; a method of trimming the modulating electrode to change the shape of the modulating electrode; a method of attaching a dielectric material to an electrode or between electrodes or removing the dielectric material therefrom; and a method of trimming an electrode pattern forming a resistor circuit.

These adjustment methods may also be applied to a structure in which a resistor is provided in an adjustment filter.

The adjustment of the frequency characteristics by the optical modulator at a specific frequency may be performed by adjusting at least one of the length of the modulating electrode and the effective refractive index of a microwave applied to the modulating electrode. In addition, in order to change in the frequency direction a frequency band that changes the frequency characteristics of the electric/optical conversion response in the vertical direction, it is possible to adjust the refractive index of the optical waveguide as well as the length of the electrode or the effective refractive index of a microwave.

For the length of the modulating electrode, when the length of the modulating electrode is increased, a frequency band to be adjusted is shifted to a low frequency side. On the other hand, when the length of the modulating electrode is decreased, the frequency band is shifted to a high frequency side.

It is possible to adjust the frequency characteristics of the electric/optical conversion response to be approximately flat when the driver is combined with the traveling-wave-type optical modulator by preparing several kinds of optical modulators having different electrode lengths in advance, selecting one of the optical modulators corresponding to the frequency band of the driver whose frequency characteristics will be corrected, and adjusting the impedance of the modulating electrode and the impedance of the termination resistor.

In addition, an electrode pattern capable of selecting a plurality of electrode lengths may be formed in one optical modulator, and an electrode pad to be connected to the modulating electrode may be selected. Alternatively, an optical modulator capable of changing the length of an electrode by, for example, trimming the electrode formed on a substrate to change a microwave transmission path may be used.

For the effective refractive index of a microwave, when the effective refractive index of the microwave is increased, a frequency band to be adjusted is shifted to a low frequency side. On the other hand, when the effective refractive index of the microwave is decreased, the frequency band is shifted to a high frequency side.

For example, in order to change the effective refractive index of the microwave, any of the following methods may be used: a method of changing the width of the signal electrode of the modulating electrode; a method of changing a gap between the signal electrode and the ground electrode; and a method of changing the thickness of the buffer layer of the optical modulator.

When these methods are used, similar to the change in the length of the electrode, several kinds of optical modulators having different effective refractive indexes of microwaves are prepared in advance, and one of the optical modulators corresponding to the frequency band of the driver whose frequency characteristics will be corrected is selected. In addition, any of the following methods may be used to change the effective refractive index of the microwave after the traveling-wave-type optical modulator is manufactured: a method of trimming an electrode to change the shape of the electrode; and a method of inserting a dielectric material between the signal electrode and the ground electrode or removing the dielectric material therefrom.

Further, the refractive index of an optical waveguide with respect to light waves may be changed in order to change in the frequency direction the frequency band that changes the frequency characteristics of the electric/optical conversion response in the vertical direction. It is possible to easily adjust the refractive index of the optical waveguide by doping a substrate with, for example, MgO.

However, when the refractive index of the optical waveguide is changed, the length of the optical path of light waves is also changed, which causes the length of the optical path that is strictly set for each optical modulator in advance to be beyond the designed value. Therefore, this method needs to be carefully used.

EXAMPLES

Next, a variation in the frequency characteristics of the electric/optical conversion response, a variation in the jitter of an optical eye pattern, and a variation in the transmission characteristics of the traveling-wave-type optical modulator according to the invention will be described with reference to experimental examples.

As the traveling-wave-type optical modulator shown in FIG. 2, an LN modulator T.MXH1.5-10 (trade name) manufactured by Sumitomo Osaka Cement Company, Ltd. (manufacturer) was used, and the high-pass filter (capacitor: 10 pF and resistance: 10Ω) shown in FIG. 5 was provided between the input interface and the modulating electrode.

Figure 8:
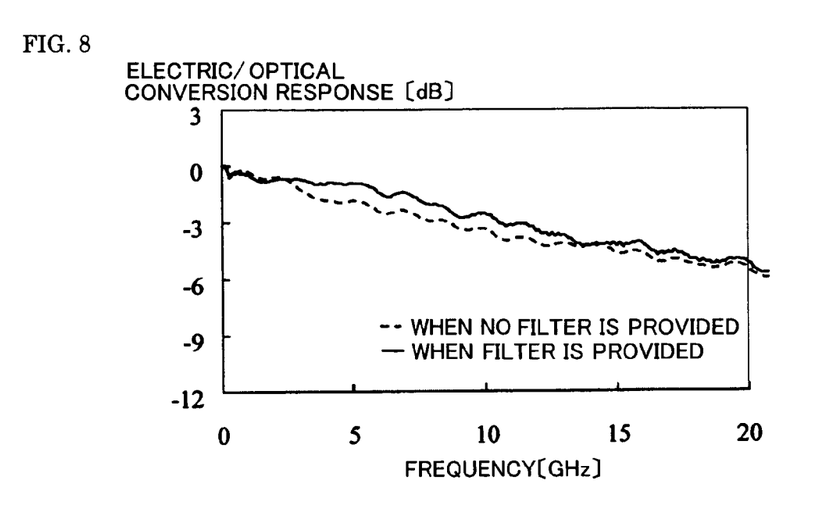
FIG. 8 is a graph illustrating variations in the frequency characteristics of the electric/optical conversion response when the adjustment filter is provided and when no adjustment filter is provided.

An optical component analyzer (86030A manufactured by Agilent Technologies) was used to measure the frequency characteristics of the electric/optical conversion response, and the measured results are shown in FIG. 8.

FIG. 8 is a graph illustrating comparison between when a high-pass filter is provided and when no high-pass filter is provided. The graph shown in FIG. 8 shows that, when a high pass-filter is provided, the frequency characteristics of the electric/optical conversion response are improved over a wide frequency band from 2 GHz to 20 GHz.

Then, as a signal source, a pulse pattern generator (MP1761B manufactured by Agilent Technologies) was used, and a 10.7 Gbps and 2^23-1 NRZ signal amplified by a driver (KGL4146 manufactured by Oki Electric Industry Co., Ltd.) was introduced to the input interface.

A semiconductor laser SLT5411-CD (trade name) manufactured by Sumitomo Electric Industries, Ltd. (manufacturer) emitted fixed light having a wavelength of 1550 nm to the LN modulator, and a variation in the jitter of the optical eye pattern of light emitted from the LN modulator was analyzed by a digital communication analyzer (86109B manufactured by Agilent Technologies). The optical eye pattern when no high-pass filter is provided (FIG. 9($a$)) and the optical eye pattern when the high-pass filter is provided (FIG. 9($b$)) are shown in FIG. 9.

Figure 9:
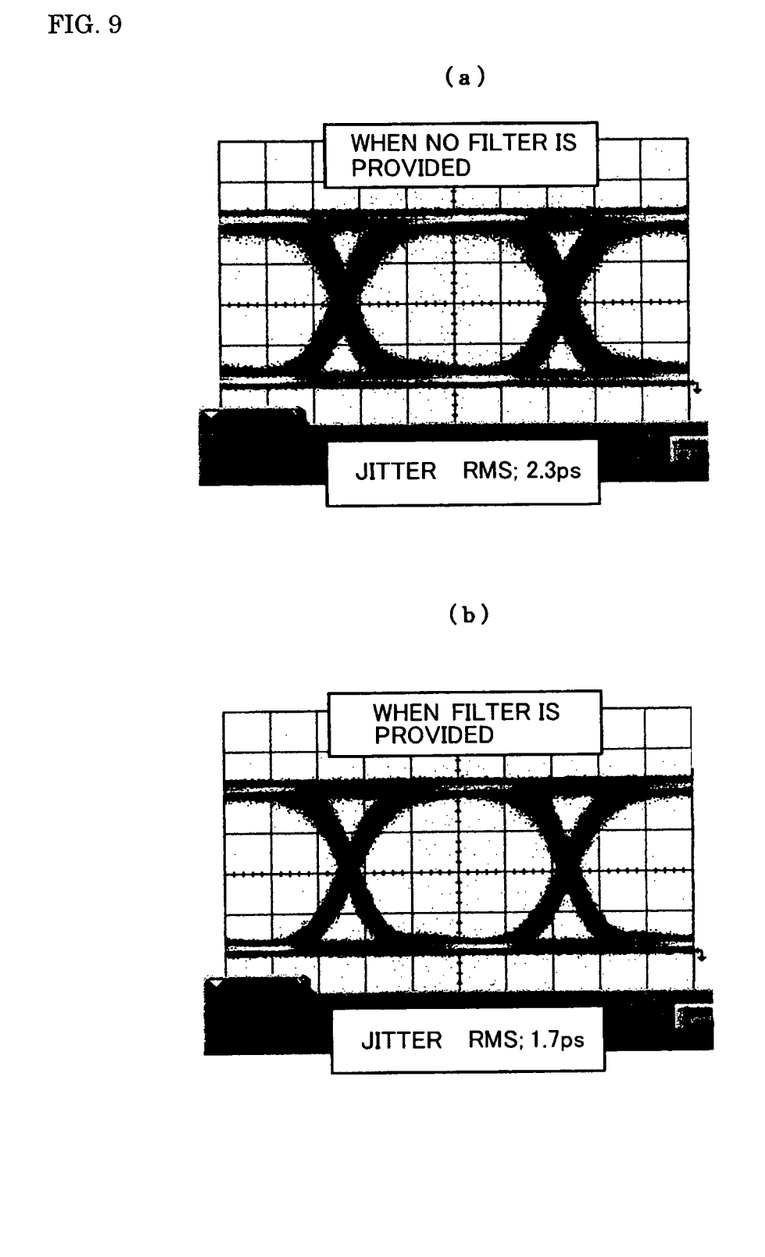
FIG. 9 is a diagram illustrating variations in an optical eye pattern when the adjustment filter is provided and when no adjustment filter is provided.

As can be seen from FIG. 9, when no high-pass filter is provided, jitter RMS is 2.3 ps, and when the high-pass filter is provided, the jitter is reduced to 1.7 ps. As a result, jitter is reduced by the high-pass filter.

Then, the bit error rate (BER) of light emitted from the LN modulator was measured by an error detector (D3286 manufactured by Advantest Corporation), and experiments on transmission characteristics were conducted. The bit error rate of light emitted from the LN modulator was measured before light was transmitted when the high-pass filter was provided and when no high-pass filter was provided. In addition, the bit error rate of light emitted from the LN modulator was measured after light was transmitted about 70 km (+1200 ps/nm) when the high-pass filter was provided and when no high-pass filter was provided. The measured results are shown in FIG. 10.

Figure 10:
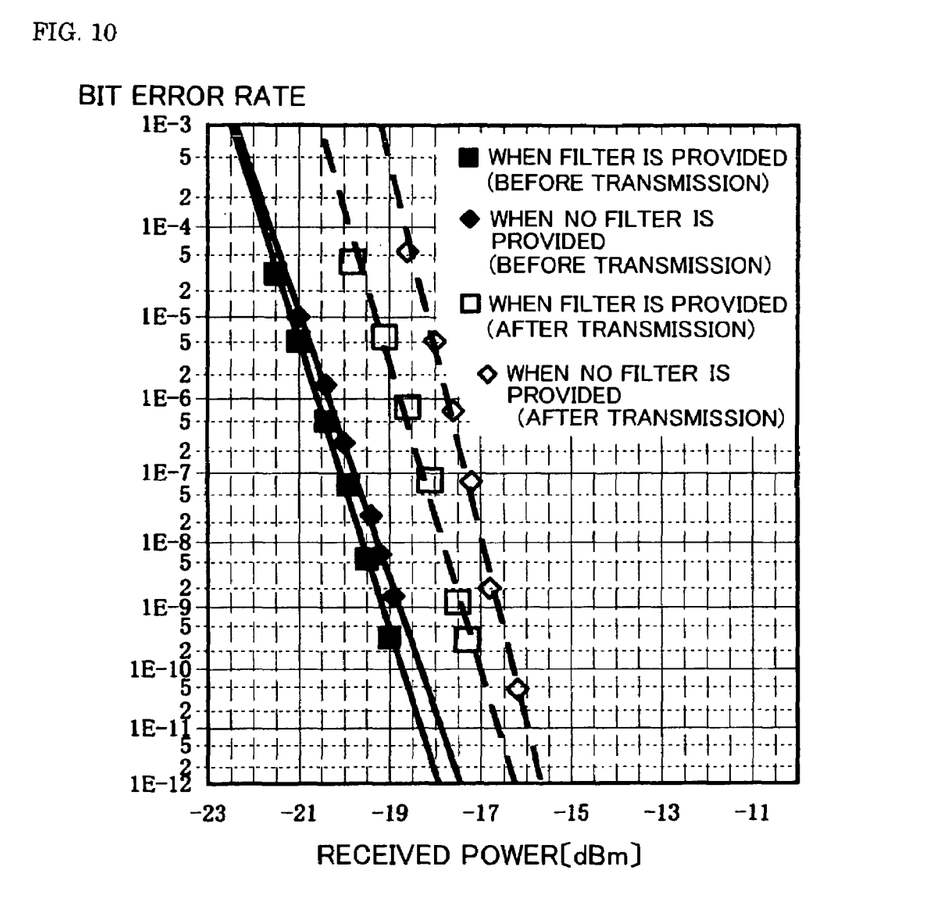
FIG. 10 is a graph illustrating variations in transmission characteristics when the adjustment filter is provided and when no adjustment filter is provided.

As can be seen from FIG. 10, before the transmission of light, when the filter is provided, received power is improved by 0.5 dB at a bit error rate of $1 \times 10^{-12}$. After light is transmitted, at the same bit error rate, received power is improved by 0.8 dB.

Next, as the adjustment filter, a high-pass filter (capacitor: 10 pF and resistance: 10Ω) was inserted between the input interface and the modulating electrode, and frequency characteristics related to the S11 characteristics of the modulator were measured. In addition, as the LN modulator, T.MXH1.5-10 manufactured by Sumitomo Osaka Cement Company, Ltd. was used, and a network analyzer (8510C manufactured by Agilent Technologies) was used as a measuring apparatus. The measured frequency characteristics of an S11 value are shown in FIG. 11.

Figure 11:
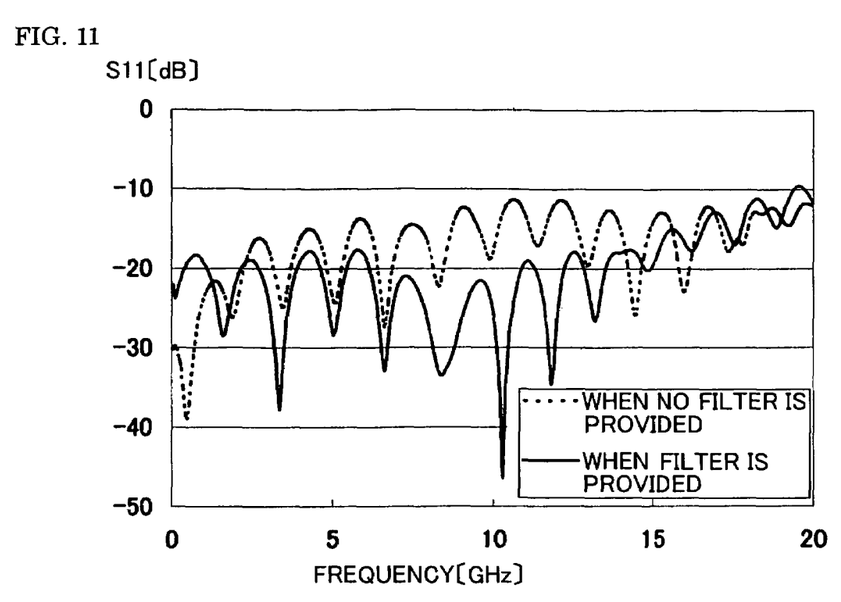
FIG. 11 is a graph illustrating variations in S11 characteristics when the adjustment filter is provided and when no adjustment filter is provided.

FIG. 11 is a graph illustrating comparison between when a high-pass filter is provided and when no high-pass filter is provided. The graph shows that, when the high-pass filter is provided, the frequency characteristics of the S11 value are improved over a wide frequency band from 2 GHz to 14 GHz.

INDUSTRIAL APPLICABILITY

As described above, according to the invention, it is possible to adjust the frequency characteristics of the electric/optical conversion response of a traveling-wave-type optical modulator over a wide frequency band. As a result, it is possible to provide a traveling-wave-type optical modulator capable of preventing the occurrence of jitter and improving optical transmission characteristics.

The invention claimed is:

1. A traveling-wave-type optical modulator comprising:
   a substrate having an electro-optical effect;
   an optical waveguide formed on the substrate;
   a modulating electrode that controls modulation of a light wave traveling through the optical waveguide, said modulating electrode comprising a signal electrode portion and a ground electrode portion;
   an input interface connected to an input side of the signal electrode portion;
   a terminator connected to an end of the signal electrode portion; and
   an adjustment filter, provided between the input interface and the signal electrode portion, that adjusts frequency characteristics,
   wherein the adjustment filter is a Bessel-Thompson filter.

2. The traveling-wave-type optical modulator according to claim 1,
   wherein frequency characteristics of the adjustment filter are adjusted to correspond to frequency characteristics of an electric/optical conversion response of the traveling-wave-type optical modulator.

3. The traveling-wave-type optical modulator according to claim 1,
   wherein a driver that controls the traveling-wave-type optical modulator is connected between the input interface and the adjustment filter, or between the adjustment filter and the modulating electrode, and
   frequency characteristics of the adjustment filter are adjusted to correspond to frequency characteristics of a gain of the driver and to frequency characteristics of an electric/optical conversion response of the traveling-wave-type optical modulator.

4. The traveling-wave-type optical modulator according to claim 1,
   wherein a termination resistance of the terminator is adjusted to adjust an impedance difference between the modulating electrode and the terminator, thereby adjusting frequency characteristics of an electric/optical conversion response of the traveling-wave-type optical modulator.

5. The traveling-wave-type optical modulator according to claim 2,
   wherein a termination resistance of the terminator is adjusted to adjust an impedance difference between the modulating electrode and the terminator, thereby adjusting the frequency characteristics of the electric/optical conversion response of the traveling-wave-type optical modulator.

6. The traveling-wave-type optical modulator according to claim 3,
   wherein a termination resistance of the terminator is adjusted to adjust an impedance difference between the modulating electrode and the terminator, thereby adjusting the frequency characteristics of the electric/optical conversion response of the traveling-wave-type optical modulator.

7. The traveling-wave-type optical modulator according to claim 1, wherein the light wave traveling through the optical waveguide is modulated in a duo-binary modulation method.

8. A traveling-wave-type optical modulator comprising:
a substrate having an electro-optical effect;
an optical waveguide formed on the substrate;
a modulating electrode that controls modulation of a light wave traveling through the optical waveguide, said modulating electrode comprising a signal electrode portion and a ground electrode portion;
an input interface connected to an input side of the signal electrode portion;
a terminator connected to an end of the signal electrode portion; and
an adjustment filter, provided between the input interface and the signal electrode portion, that adjusts frequency characteristics,
wherein
frequency characteristics of the adjustment filter are adjusted to correspond to frequency characteristics of an electric/optical conversion response of the traveling-wave-type optical modulator,
a driver that controls the traveling-wave-type optical modulator is connected between the input interface and the adjustment filter, or between the adjustment filter and the modulating electrode,
the frequency characteristics of the adjustment filter are adjusted to correspond to frequency characteristics of a gain of the driver,
the adjustment filter is a Bessel-Thompson filter, and
a termination resistance of the terminator is adjusted to adjust an impedance difference between the modulating electrode and the terminator, thereby adjusting the frequency characteristics of the electric/optical conversion response of the traveling-wave-type optical modulator.

9. The traveling-wave-type optical modulator according to claim 8, wherein the light wave traveling through the optical waveguide is modulated in a duo-binary modulation method.

* * * * *